April 8, 1958     I. H. CULVER     2,829,850
AIRCRAFT EJECTION SEAT
Filed Nov. 13, 1956     4 Sheets-Sheet 1
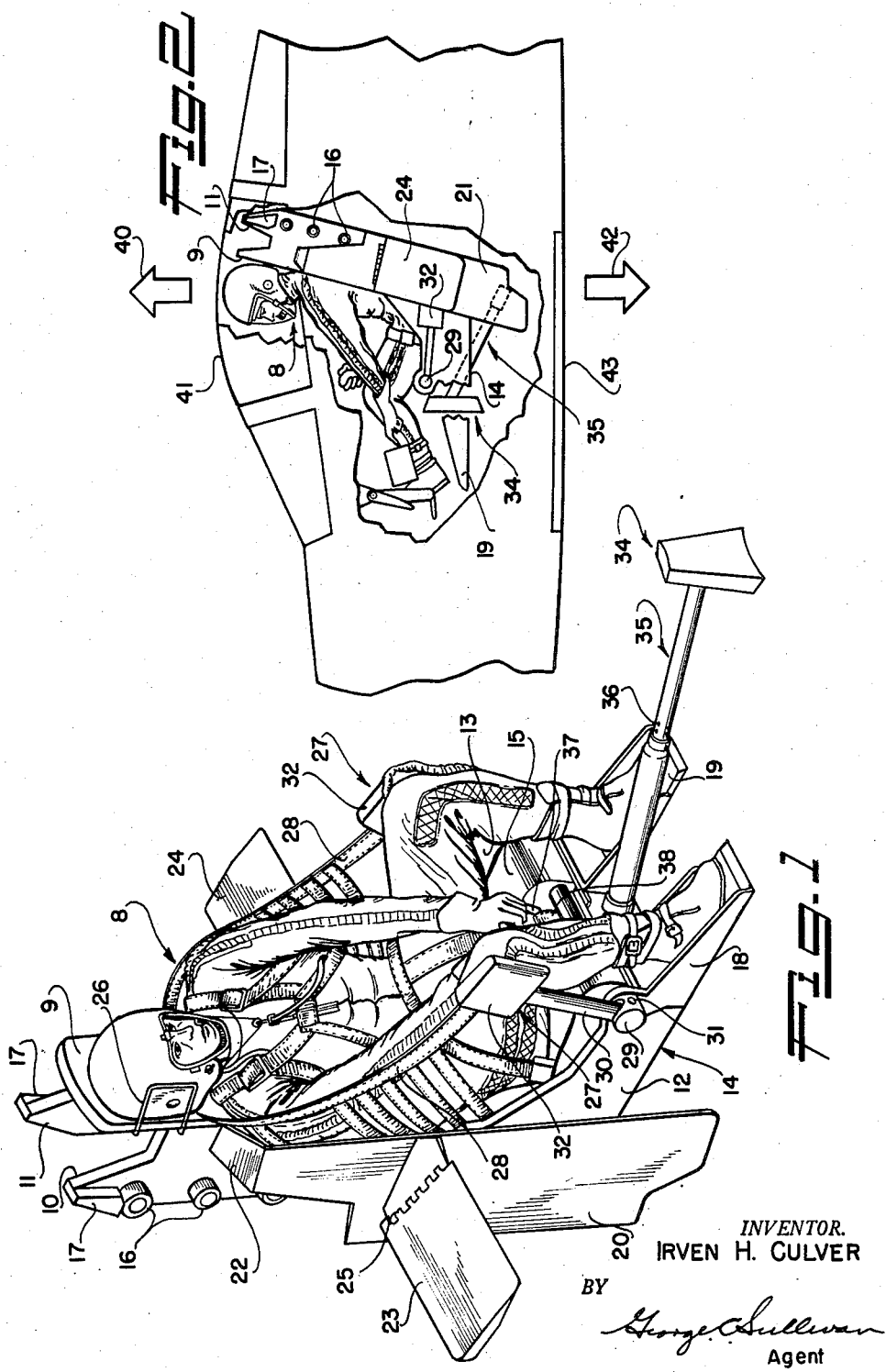
INVENTOR.
IRVEN H. CULVER
BY
*George C. Sullivan*
Agent April 8, 1958
I. H. CULVER
2,829,850
AIRCRAFT EJECTION SEAT
Filed Nov. 13, 1956
4 Sheets-Sheet 2
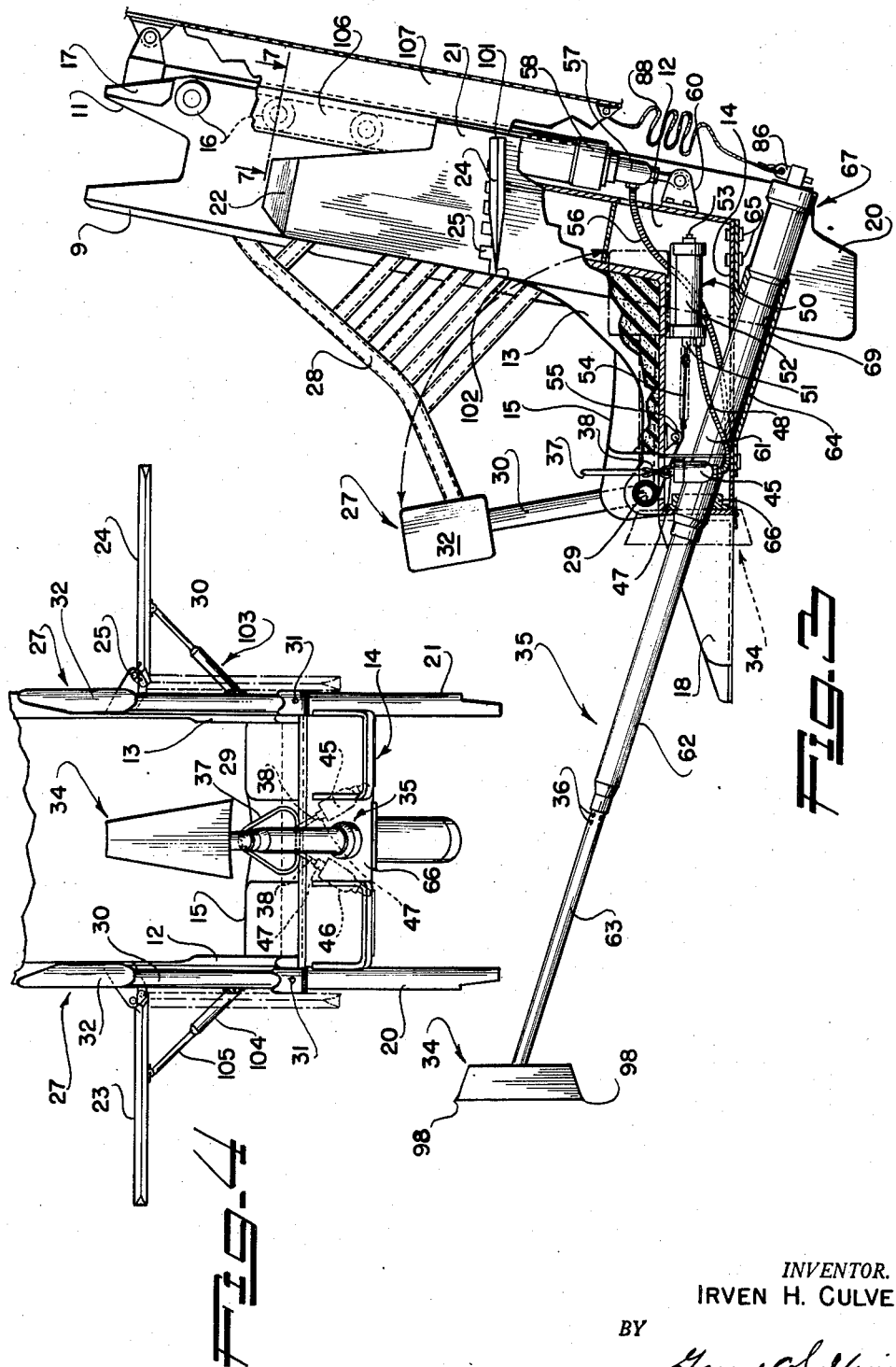
INVENTOR.
IRVEN H. CULVER
BY
*George C. Sullivan*
Agent April 8, 1958     I. H. CULVER     2,829,850
AIRCRAFT EJECTION SEAT
Filed Nov. 13, 1956     4 Sheets-Sheet 3
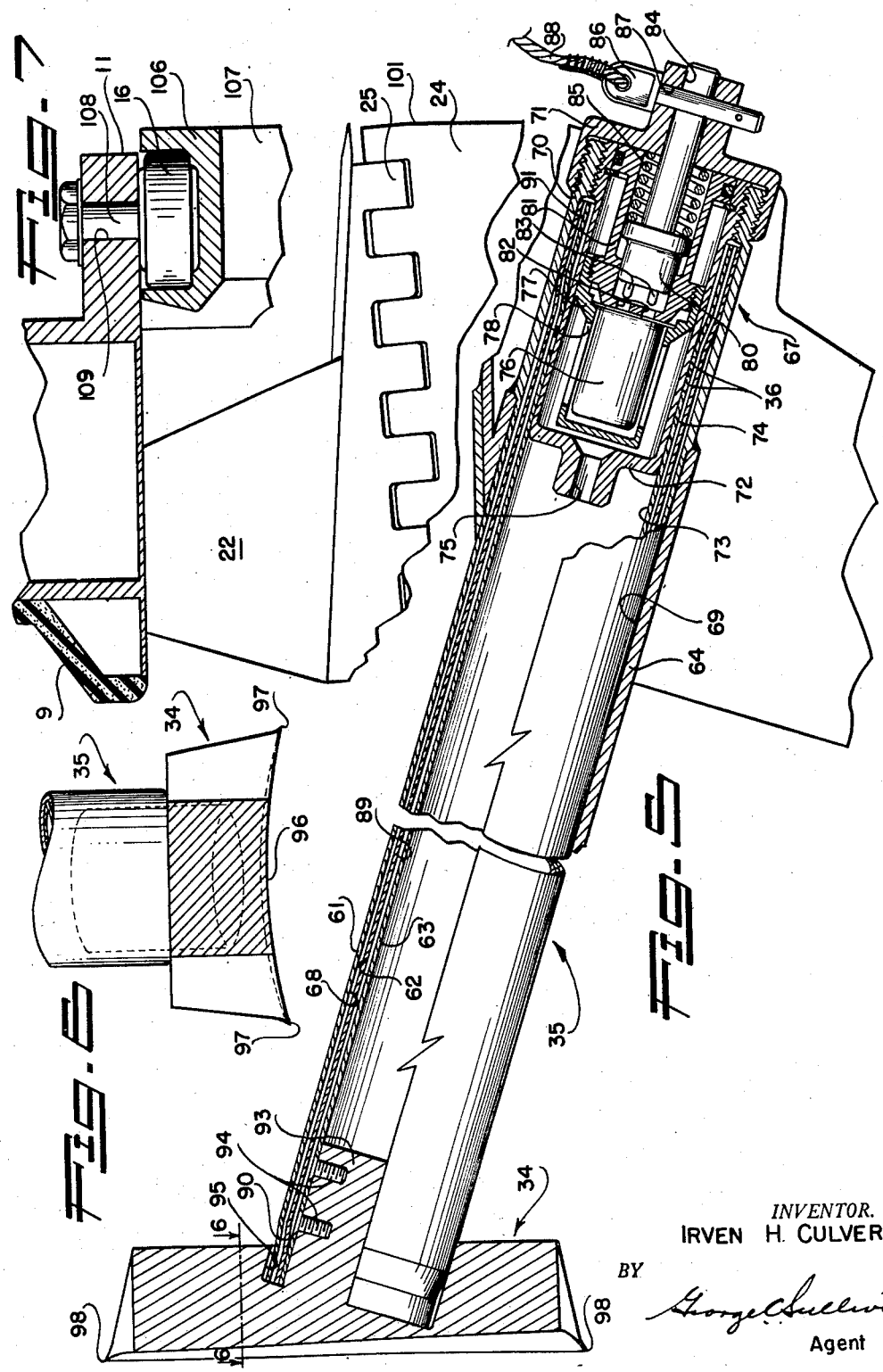
INVENTOR.
IRVEN H. CULVER
BY
George C. Sullivan
Agent April 8, 1958 — I. H. CULVER — 2,829,850
AIRCRAFT EJECTION SEAT
Filed Nov. 13, 1956 — 4 Sheets-Sheet 4
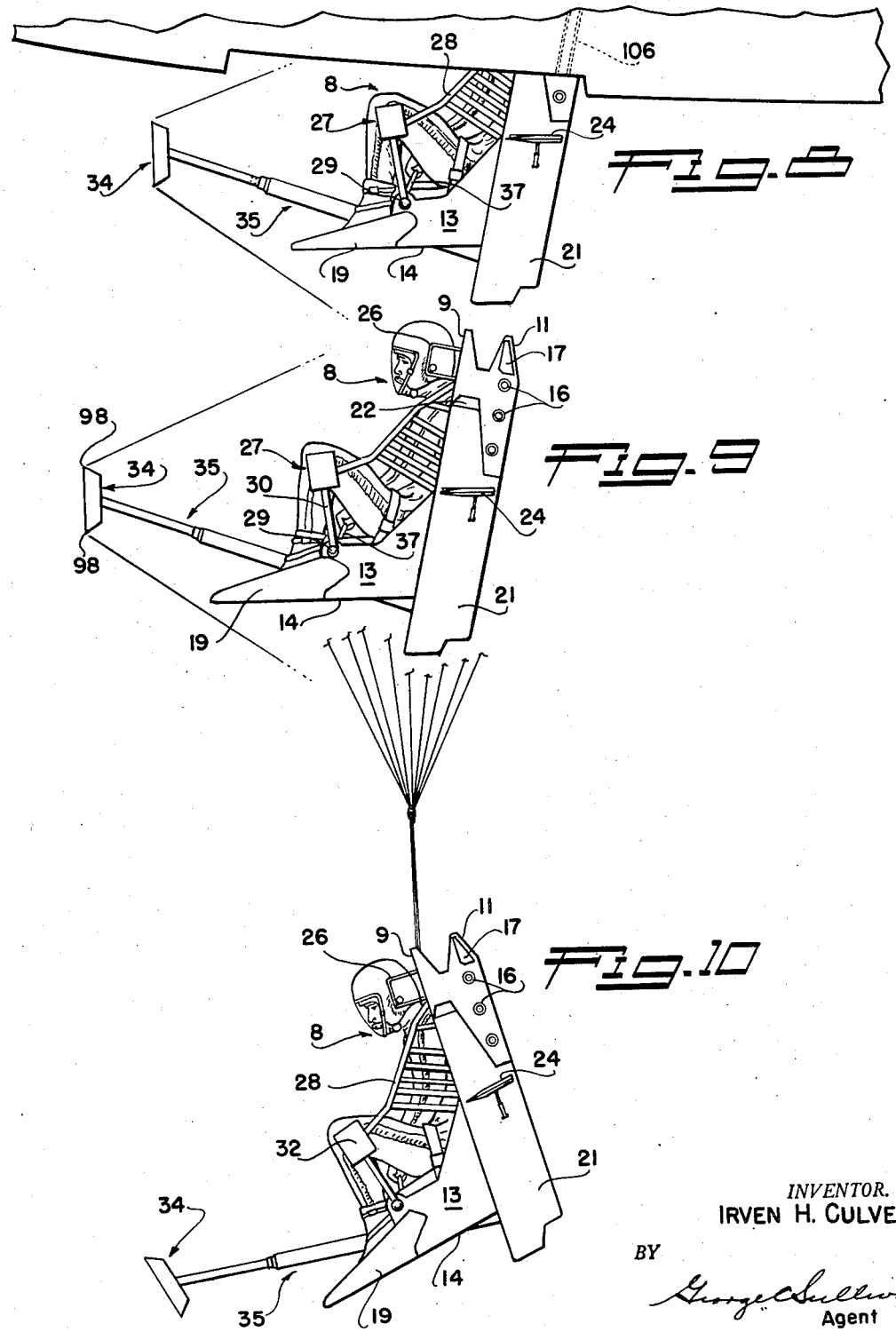
INVENTOR.
IRVEN H. CULVER
BY
George C. Sullivan
Agent

United States Patent Office 2,829,850
Patented Apr. 8, 1958

2,829,850

AIRCRAFT EJECTION SEAT

Irven H. Culver, Burbank, Calif., assignor to Lockheed Aircraft Corporation, Burbank, Calif.

Application November 13, 1956, Serial No. 621,667

11 Claims. (Cl. 244—141)

The present invention relates to aircraft escape systems and, more particularly, to means for protecting ejecting personnel from aircraft moving at high velocity when, in time of emergency, it becomes necessary for such personnel to leave the aircraft in flight and to parachute down to earth.

Those skilled in the art know that until the development of high speed aircraft capable of speeds of 400 miles per hour and more, it was not difficult for a person to exit from an airplane in flight in time of emergency by his own unaided efforts and to return to earth by parachute. In those days, the forces acting on a person to impede his exit from an airplane were not great enough to prevent a flier from overcoming them by his own muscular strength; nor was the force of the air slipstream on him, when once out of the airplane, great enough to carry him back against and cause a collision against the airplane.

With the advent of high speed aircraft, however, emergency exit of personnel during flight could no longer be effected in the manner practiced heretofore. The main reason for this was the action of speed of generated forces, many times the force of gravity, became so great as to make it exceedingly difficult, if not impossible, for a flier to move himself out of the airplane by his own strength.

For these and other reasons it has become necessary to equip aircraft capable of flying high speeds with some means to provide for forcibly ejecting personnel therefrom when emergency exit became necessary during flight. The use of such means made exit from the airplane possible without the necessity for the expenditure of any great amount of muscular energy. This has been accomplished in a manner which projects the seat, together with the occupant thereof, from the airplane with sufficient force and rapidity so as to eliminate possibility of collision with the after structure of the airplane in the case of upward ejection, or the possibility of collision with landing gear and other equipment beneath the aircraft during downward ejection. Following ejection, the flier separates himself from the seat, waits a few seconds for the seat to fall far enough away from him, then resorts to his parachute to return to earth.

However, difficulties have been encountered when employing present aircraft escape systems having ejection seats in aircraft capable of speeds over 600 miles per hour, and more, which are due to the fact that the ejected flier decelerates too rapidly, which generally kills or seriously injures him. Typical ejection seats have employed apparatus which quickens deceleration of the ejected pilot, such as flaps projected outwardly about the seat, or the use of a deceleration parachute. These types of apparatus are totally unsuitable for ejection at supersonic speeds because the ejected flier is decelerated at a rate beyond physical limitations. For example, too rapid a deceleration causes the internal body organs to be dislodged from the usual location in the body and be smashed against the inside of the body skin. Needless to say, the consequences of rapid deceleration are extremely dangerous to an ejected pilot.

Accordingly, the present invention provides a means for obviating the problems associated with rapid deceleration. It has been found that the deceleration rate of the flier must be within allowable human limits or serious physical damage or death may occur. Consequently, the present invention provides means whereby the seat and pilot are moderately decelerated within human tolerances and the forces and pressures present in current rapid deceleration system are not encountered. The present invention accomplishes safe ejection by employing a skip-flow generator which is projected in front of the seat to generate an aerodynamic skip-flow around the blunt body of the ejection seat and the man; thus, less aerodynamic drag of seat and man is provided. With less drag, the seat and man are allowed to decelerate at a lower rate, thus reducing the "G" forces applied to the man during the deceleration period after ejection from an aircraft at high speeds.

It is, therefore, an object of the present invention to provide an ejection seat which reduces aerodynamic drag and a seat which is aerodynamically stable during flight after ejection.

It is desirable that such an ejection seat, after jettisoning, shall have a sufficient degree of directional and longitudinal stability to prevent pitching and yawing motions, which would bring into play large aerodynamic forces and attendant dangerous accelerations, such as pin-wheeling, for example. One of the objects of the present invention, therefore, is to evolve an arrangement having this desirable feature.

It is another object of the present invention to provide a light-weight aerodynamic streamlined vehicle for personnel to exit from an aircraft in emergencies at high speeds. It is important to provide a vehicle which, because of its configuration, reduces aerodynamic drag.

Still a further object of the present invention is to reduce the aerodynamic drag of an aircraft ejection seat which has a low deceleration after ejection, thereby reducing the very high hazardous "G" forces applied to the pilot during the deceleration period after ejection. In this manner, the survival of the man is achieved upon ejection from aircraft at high speeds.

Another object of the present invention is to provide a means for reducing the effects of wind-blast upon the pilot riding in the ejected seat. This feature is accomplished by the present invention in surrounding the ejected pilot in a form of atmospheric capsule.

Still another object of the present invention is to provide an aerodynamic drag reducer on an ejection seat which comes into action prior to the seat leaving the aircraft and which affects the deceleration rate of the seat.

Another object of the present invention is to provide means for stabilizing the ejection seat and pilot after ejection has taken place against such conditions as pitching and yawing.

Still another object of the present invention is to provide means for preventing body portions or personal equipment from floundering during seat ejection.

The foregoing and other objects and advantages of my invention will become apparent from an inspection of the following description and the accompanying drawings which describe and show, respectively, one embodiment of my invention. It must be realized, however, that my invention may exist in forms other than that herein shown and described.

In the drawings:

Figure 1 is a perspective view in accordance with the present invention illustrating a pilot and seat ejected having stabilizing means, restraining means, and aerodynamic drag reducing means extended;

Figure 2 is a side view showing the pilot and seat of Figure 1 incorporated in an aircraft prior to ejection;

Figure 3 is a side view of the seat employed in Figure 1 having drag reducing means, stabilizing means and restraining means extended as during ejection and as showing the actuation means therefor;

Figure 4 is a front view of the ejection seat in accordance with Figure 3;

Figure 5 is a sectional view of the drag reducing means prior to its activation;

Figure 6 is a sectional view of a skip-flow generator carried by the drag reducing means taken in the direction of arrows 6—6 of Figure 5;

Figure 7 is a sectional view showing the seat rollers associated with guide rails carried by the aircraft taken in the direction of arrows 7—7 of Figure 3; and Figures 8 to 10 are diagrammatic views showing the successive positions of pilot ejection from a flying aircraft employing the apparatus of Figure 1.

With reference to Figure 1, an ejection apparatus is shown in accordance with the present invention which illustrates a pilot 8 seated in a basic seat arrangement. The basic seat arrangement comprises a seat back 9 supporting the back and head of the pilot and a pair of main supports 10 and 11 secured to the seat back as by welding. A pair of sides 12 and 13 are welded or otherwise fixed to the supports respectively on alternate sides of the pilot and are joined by means of a seat bottom 14. Cushion 15 is provided for the comfort of the pilot. The sides and seat bottom are joined or welded to the seat supports, all of which form the basic seat configuration. A plurality of rollers, such as rollers 16, and a V-shaped block 17 are provided on each seat support so that the basic seat may be slidably mounted in guide rails 106 (as shown in Figure 7) carried by the aircraft structure. The V-shaped blocks reduce launching perturbations by substantially eliminating the transmittal of shear forces to the seat when the last roller slides out of engagement with the guide rails. The blocks are shown in suitable position for downward ejection to correspond with the sequence shown in Figures 8–10. However, it should be understood that the blocks may be located on the lower end of each side support for upward ejection. A pair of foot rests 18 and 19 is provided on the seat bottom so that the pilot's feet may be accommodated during ejection.

The basic seat arrangement is provided with flight stabilizing means comprising a pair of side fins 20 and 21, each of which is welded to opposing seat sides and opposing main supports via a member 22 carried by each side fin. The side fins in conjunction with the forward center of gravity resulting from extension of a skip-flow generator (to be described later) provide directional stability. The fins extend below the bottom of the seat. The stabilizing means further includes a pair of horizontal vanes 23 and 24 which are hinged at approximately the middle of the fins, and extend up, when actuated, to limit roll velocity for improved flight dynamics. Hinge 25, associated with each vane, such as vane 23, is angular with respect to side fin 20 so that the vanes may be raised outwardly from the side fins when aerodynamically actuated by oncoming airflow.

The basic seat arrangement is provided with a restraining means for keeping portions of the pilot's body and personal equipment from floundering during ejection and subsequent flight. The restraining means comprises a pair of lateral head supports 26 which clamp the helmet on each side to relieve the effects of air loads on the pilot's neck, leg guards 27, which pivot forward alongside the pilot's knees, in order to prevent his legs from spreading under air loads, and restraining webbing 28 is provided alongside the pilot's arms to prevent outward motion while allowing air loads to counteract inertia forces. The leg guards 27 comprise a rod 29 rotatably mounted on the seat sides and extending beyond the width of the basic seat arrangement so that a pair of members 30 may be attached to opposing ends of the rod 29 by means of a key 31. Mounted on the end of member 30, opposite to its end attached to rod 29, is a knee brace 32. Attachment of the knee brace to member 30 may be achieved by suitable means, such as welding, for example. The restraining webbing may be constructed of canvas or other flexible materials and is attached to the leg guards, seat sides and seat back by suitable fastening means (not shown) such as snaps or hooks, for example.

In order to reduce aerodynamic drag of the seat and man after ejection and in flight, means are provided on the bottom of the seat which are projected from between the pilot's feet forward of the seat to surround him, in effect, with an atmospheric capsule. This means comprises, in general, a plate 34, which I will term a skip-flow generator, carried at the end of an actuated telescoping extension tube 35. This plate, presented to the air stream at a slightly uptilted angle, modifies the airflow pattern to reduce decelerative "G" loads and air-blast on the occupant of the seat. Schlieren studies at a speed of Mach 2 show a faired body flow deflection obtained with skip-flow in contrast to the drag producing disturbances obtained with the conventional blunt seat. Such an atmospheric capsule results in reducing chest pressure on the pilot to substantially one-quarter that resulting with the conventional seat and no skip-flow. One characteristic of the skip-flow generator is its increased drag reduction with increase in Mach number. Pitch stability and trim in normal ejection attitude are improved by forward location of center of gravity and aerodynamic effects of the extended skip-flow generator. Restoring pitching motions extend over a large angle range and thus, accepting launching perturbations. A plurality of apertures 36 is provided in tube 35 in order to reduce the opening shock of the telescoping sections of tube 35.

The leg guards 27 and skip-flow generator 34 are actuated pyrotechnically by the pilot's grasping a ring 37 attached to a pair of straps 38 to cause the firing of explosive charges (to be described in detail later).

As shown in Figure 2, the ejection seat contemplated by the present invention is susceptible to either upward ejection in the direction of arrow 40 through an escape hatch or canopy 41 or downward ejection in the direction of arrow 42 through an escape hatch 43. This figure also shows the seat and pilot prior to actuation of the ejection catapult (not shown) wherein the stabilizing means, restraining means and skip-flow generator are in their normal inactuated and stowed positions. In their inactuated positions, the horizontal vanes are arranged to rest substantially alongside the side fins, the leg guards 27 and the restraining webbing 28 are pivoted rearwardly to allow freedom of pilot's arms and legs while the aircraft is in flight and the skip-flow generator 34 is nested between the foot rests 18 and 19.

With reference to Figures 3 and 4, it can be seen that ring 37 is connected to a pair of conventional pyrotechnic devices 45 and 46 which are of the type wherein force urging pins 47 outwardly causes cartridges (not shown) to explode. For example, a pyrotechnic initiator 67 such as is shown in Figure 5 may be employed. Device 45 is employed to actuate the leg guards 27 and restraining webbing 28 prior to ejection of the seat. Gases generated by the explosive charge are transmitted via a tube 48 to a hydraulic actuator 50 suitably fastened to the seat bottom. Actuator 50 comprises a piston 51 slidably carried within a body 52 so that applied gases from tube 48 causes the piston to move within the cylinder. The action of the piston may be dampened by providing a small blowout plug 53 so that progression of the piston within the cylinder forces the hydraulic fluid contained in the cylinder to blow out the plug and thereby permitting the piston to advance through the cylinder. One end of a strap 54 is attached to the end of the piston 51 while its opposite end is attached to and wrapped around rod 29 so movement of the piston is translated into pivotal movement of the rod 29 via strap 54. A small roller 55 is carried by the bucket seat in order to provide a slight tension on the strap and to take up slack.

Pyrotechnic device 46 contains a delay powder charge and is employed to provide gases via tube 56 to a catapult initiator 57 which, in turn, fires a catapult 58 which causes the seat to eject from the aircraft. The time delay is required so that the leg guards 27 and restraining webbing 28 will be in position prior to the ejection of the seat. Catapult 58 and its initator 57 are secured to the basic seat by a linkage 60. The catapult may be of any suitable variety and may be arranged to effect upward or downward ejection as desired.

As shown in Figure 3, extension tube 35 includes several telescoping tube sections, such as an outer tube section 61, an intermediate tube section 62 and an inner tube section 63 carrying skip-flow generator 34. Outer tube section 61 is carried beneath the seat bottom 14 by means of a fixture 64 having a bore 69 through which tube 61 is fitted. Attachment of the section 61 to the fixture may be suitably achieved by welding, for example. Fixture 64 is secured to the seat by bolts, such as bolt 65. The forward end of outer tube section 61 extends through a front plate 66 of the basic seat arrangement. The skip-flow generator 34 and various tube sections are actuated by a pyrotechnic initiator 67 secured to the end of outer tube section 61.

As seen more clearly in Figure 5, the various tube sections are shown in their stowed position prior to actuation. Outer tube section 61 has a cylindrical bore 68 and is externally threaded at its lower end 70 which receives a cap 71 of pyrotechnic initiator 67. Cap 71 is a cup-like member and is provided with internal threads which engage with the threads provided on the lower end of outer tube section 61. This cap serves to completely close off that end of the outer tube section from the outside atmosphere. The lower end 70 of the outer tube section is provided with internal threads which are engaged by external threads provided on a housing 72 which fits through the cylindrical bore 73 at the lower end 74 of the inner tube section 63. Housing 72 is provided with an aperture 75 communicating the interior of the housing with bore 73.

Disposed interiorly of the housing 72, there is provided a conventional explosive cartridge 76 held in firing position within a holder 77. Holder 77 is provided with an aperture 78 which communicates with the interior of the housing so that gases generated by the exploded cartridge 76 may pass through aperture 75 into bore 73 of the inner tube section.

Cartridge 76 is caused to explode by means of a double firing pin arrangement 80 movably supported by a firing pin holder 81. Holder 81 is threadably engaged with cartridge holder 77 and is provided with a pair of small bores 82 aligned to pass the double firing pins 83 through the pin holder into forcible engagement with the bottom of cartridge 76. The firing pin arrangement projects through a bore 84 provided in cap 71 and it remains in position against the compressive force of a spring 85 by means of a lock pin 86. The lock pin is inserted through aligned bores 87 provided in cap 71 and firing pin arrangement 80 to hold the double pins in their safety positions. A lanyard 88, which is fastened between lock pin 86 and the aircraft structure so that as the seat progresses along the guide rails lanyard slack is taken up until the lock pin is finally pulled from bore 84 to release the firing pin.

Intermediate tube section 62 is a hollow, cylindrical member having a bore 89. The opposing ends of this tube are provided with a flared portion 90 and 91, respectively. Flare portion 90 is associated with the upper end of the intermediate tube section and is of smaller diameter than flared portion 91 associated with the lower end. The intermediate tube section fits concentrically within outer tube section 61 in which it is slidably supported by virtue of its engagement with the inner tube section 63 and housing 72. Inner tube section 63 is a hollow, cylindrical member having a substantially constant diametered bore 73. The skip-flow generator plate 34 is fastened to the upper end of the section by means of an extension 93 fitted into bore 73 and secured therein by a plurality of screws 94.

The extension 93 is integral with the plate 34 and is outlined by an annular recess 95 adapted to receive the upper ends of the various tube sections. The annular recess is angular to the perpendicular plane of the skip-flow generator with respect to the axis of on coming airflow.

The skip-flow generator, as shown in Figures 5 and 6, including plate 34, is provided with a contoured or concave surface 96 in order to accommodate movement of the control stick (not shown) located in front of the seat while the flier is piloting the aircraft. The plate is preferably made of lead or other heavy material, weighing approximately 35 pounds, for example. The weight of the plate and the length of the extension tube 35 may be computed with reference to the basic seat arrangement to establish a suitable center of gravity location so that the seat may be stabilized in flight. It is to be understood that the shape and size of plate 34 are not critical so long as substantially sharp edges, as edges 97 and 98, are provided thereon. It is these edges which create the separated flow (skip-flow) to provide an atmospheric capsule surrounding the ejected pilot and seat.

The basic principle of separated flow is that a region of low energy air is created behind the bluff sharp edged body 34 where pressure communication is possible with very low pressure gradients. This turbulent low directed energy region creates a shape which is consistent with the laws of fluid dynamics which apply to the case; that is if the flow outside of the separated region and bounding this region is below Mach 1, the fore and aft shape of the turbulent region will be consistent with the subsonic aerodynamics and therefore the lines will be curved in order to satisfy the conditions of essentially constant pressure within the low energy region. If, on the other hand, the flow external to the low energy region is supersonic the fore and aft shape of the separated region will be essentially in a straight line. In essence, then, the shape of the separated region will be consistent with the external aerodynamics, that is, outside of the boundary interface between the low energy region and the external flow.

Figure 4 shows the horizontal vanes 23 and 24 in their outward position represented by solid lines and their inactuated position represented by dotted lines. The vanes are carried by the side fins by means of a hinge 25, welded to each fin, substantially in the middle thereof. Each vane is tapered from the trailing edge 101 to its leading edge 102 so that upon ejection of the seat into oncoming airflow, the vanes are aerodynamically actuated to their outward position. To insure that the vanes are maintained in this position an arrester 103 is provided for each vane which comprises a cylinder 104 pivotally attached to each side fin and a piston 105 adapted to be drawn out of the cylinder by the outward movement of the vane to which it is pivotally attached.

Figure 7 illustrates more clearly the position of rollers 16 and guide rails 106 carried by the structure 107 of the aircraft. The rollers are arranged to freely rotate within the guide rails. Each roller of the plurality is attached to a seat support, such as support 11, by means of a bolt 108 extending through a bore 109.

The operation of the present invention will be described with particular reference to Figures 3, 4, 8, 9 and 10 respectively.

In operation, the ejection seat of the present invention, as shown in Figure 2, allows the pilot freedom of movement to control his aircraft by stowing skip-flow generator 34 between the foot rests at the bottom of the seat, maintaining the horizontal vanes in a position substantially parallel to and adjacent the side fins and stowing the leg guards and restraining webbing out of the pilot's way. In an emergency, when the pilot desires to eject himself from his aircraft, ring 37, as shown in Figure 3, is urged upwardly to actuate pyrotechnic devices 45 and 46 respectively via straps 38 and pins 47. Firing of pyrotechnic device 45 causes gases to fill tube 48 and to be transmitted to actuator 50. The gases supplied by tube 48 fill cylinder 52 which, in turn, urges piston 51 to travel through cylinder 52 of actuator 50. When compression of hydraulic fluid within cylinder 52 reaches a predetermined compression, plug 53 will blow out from the end of the cylinder to release the compressed fluid through a damping orifice provided by the blown out plug.

The linear stroke of piston 51 is followed by strap 54 which is wrapped around and attached to rod 29. As the strap is progressively pulled by piston 51, it is unrolled from its storage area on rod 29 while simultaneously rotating rod 29 in a counterclockwise direction. Inasmuch as member 30 associated with each leg guard 27 is attached to opposing ends of rod 29, the leg guards are pivoted forward from their rearward stowed position. The stroke of piston 51 which controls the movement of strap 54 is of sufficient length to pivot the knee braces 32 adjacent the pilot's knees before stopping.

The pivoting of the leg guards to their forward leg and knee protecting position also unfolds restraining webbing 28 which partially encircles the pilot to prevent floundering of arms or personal equipment.

By means of a time delay charge provided in pyrotechnic device 46, gases are not provided to tube 56 until piston 51 has completed its working stroke. At this time the gas in tube 56 will be fed to pyrotechnic initiator 57. Activation of initiator 67 fires main catapult 58 which initiates the sliding of the ejection seat down rails 106 by means of rollers 16 riding thereon. As the ejection seat travels down (in the present instance) the guide rails 106, lanyard 88 is tightened until pin 86 is withdrawn from bore 87 provided through cap 71 of pyrotechnic initiator 67.

With reference to Figure 5, it can be seen that withdrawal of pin 86 from initiator 67 causes compression spring 85 to forcibly urge firing pin 80 through apertures 83 into forcible engagement with the bottom of cartridge 76. This forcible engagement causes cartridge 76 to fire and thereby provide gases through aperture 78 into the interior of housing 72 where the gases are transmitted through aperture 75 into cylindrical bore 73 of inner tube section 63.

As the bore 73 fills with expanding gases from exploded cartridge 76, great pressure is built up therein which acts against extension 93 of skip-flow generator 34. This action urges inner tube 63 to be slid outwardly within intermediate tube section 62 until the lower end of tube 63, which is of larger diameter than flared portion 90 of the intermediate tube section 62, engages with flare portion 90 and is firmly secured thereto by the swedging action of the two parts. The engagement of these tube sections with each other is equivalent to an interference type fit and may be considered swedged into permanent engagement.

For purposes of clarity, inner tube section 63 and intermediate tube section 62 may now be considered one tube. Inasmuch as intermediate tube section 62 is not secured to any structure but is slidably supported within outer tube section 61, intermediate tube section 62 will progress outwardly until its flared portion 91 swedges with the upper end of outer tube section 61 which is of smaller diameter to form a substantially permanent engagement. With the various tube sections swedged together, extension rod 35 is formed and skip-flow 34 extends forward of the seat to intercept oncoming airflow.

In order to adequately protect the pilot from rapid deceleration, the skip-flow generator is projected to its forward position prior to the ejection seat leaving guide rails 106 of the aircraft. As soon as the airflow is intercepted by the horizontal vanes, the vanes are aerodynamically lifted to their substantially horizontal position in the middle of side fins 20 and 21 and maintained in this position by arrester 103.

With reference to Figure 8, horizontal vanes 23 and 24, leg guards 27, restraining means 28 and skip-flow generator 34 are positioned prior to separation of the ejection seat from the aircraft. Figure 9 shows the shock wave created by edges 98 of the skip-flow generator which reduces aerodynamic drag and thereby protects the pilot from rapid deceleration and wind-blast. Descent is made by the pilot in a stable seat until reaching proper altitude and deceleration at which time a parachute is deployed from the seat. After the initial shock of the parachute opening is taken by the seat, the seat separates from the pilot, allowing normal descent to the ground.

Having described only a typical form of the invention I do not wish to be limited to the specific details herein set forth, but wish to reserve to myself any variations or modifications that may appear to those skilled in the art and fall within the scope of the following claims.

I claim:

1. An ejection seat for use in an aircraft having guide rails and an escape hatch comprising, a basic seat arrangement slidably mounted on the guide rails, means secured to the seat for forcibly ejecting the seat through the escape hatch, side fins oppositely attached to the seat for yaw stabilization, horizontal vanes secured to the side fins substantially in the middle thereof for limiting roll velocity, and a skip-flow generator carried forward of the ejected seat to separate oncoming airflow to provide an atmospheric capsule around the seat.

2. An ejection seat for use in an aircraft having guide rails and an escape hatch comprising, a basic seat arrangement slidably mounted on the guide rails, means secured to the seat for forcibly ejecting the seat through the escape hatch, a pair of parallel side fins separated by the seat, a movable vane hinged to each side fin substantially in the middle thereof, hinge means for aerodynamically moving the vanes substantially perpendicular to the side fins during ejection, and a skip-flow generator carried forward of the seat to separate oncoming airflow to reduce aerodynamic drag of the ejected seat.

3. An ejection seat according to claim 2 including, a pair of leg guards separated by the seat and pivotally mounted thereon, restraining means fastened to the leg guards and seat, and means for pivoting the leg guards prior to seat ejection.

4. Means for modifying airflow patterns to reduce decelerative "G" loads and airblast on an occupant of an ejection seat, comprising, a skip-flow generator having a substantially sharp edged periphery, and an extension rod secured to the seat for carrying the skip-flow generator forward of the seat to intercept oncoming airflow.

5. Means for modifying airflow patterns to reduce decelerative "G" loads and airblast on an occupant of an ejection seat, comprising, a skip-flow generator having a substantially sharp edged periphery, an extension rod secured to the seat for carrying the skip-flow generator, and means for forcibly projecting the skip flow generator via the extension rod forward of the seat to intercept oncoming airflow.

6. The elements set forth in claim 5 wherein the extension rod comprises, a plurality of slidable telescoping tube sections, the outer tube section secured to the seat, the inner tube section carrying the skip-flow generator, and means for engaging the plurality of tube sections to form the extension rod.

7. Means for modifying airflow patterns to reduce decelerative "G" loads and airblast on an occupant of an ejection seat, comprising, a skip-flow generator carried by the seat, at least one substantially sharp edge associated with the generator to intercept oncoming airflow, pyrotechnic means for projecting the generator forward of the seat, and means carried by the seat to stabilize the seat during flight.

8. An aerodynamic drag reducer for aircraft escape systems comprising, a basic seat ejectable from an aircraft, a member projecting forwardly from the seat, and a sharp-edged plate carried on the forward end of the member intercepting oncoming airflow.

9. The elements set forth in claim 8 wherein the plate is provided with a broad face generally normal to the plane of the seat.

10. An aerodynamic drag reducing device for aircraft escape systems comprising a seat ejectable from an aircraft, an extendable member projecting forwardly from the seat, means carried by the seat to extend the member, and a broad-faced sharp-edged plate carried on the forward end of the member to intercept oncoming airflow.

11. An aerodynamic drag reducing device for aircraft escape systems comprising a seat ejectable from an aircraft, an extensible rod carried by the seat, means for projecting the rod forwardly from the seat, a sharp-edged plate secured to the forward end of the rod having a face lying generally normal to the plane of the seat, and the plate having a predetermined mass to locate the center of gravity of the ejected seat.

References Cited in the file of this patent

UNITED STATES PATENTS 2,702,680   Heinemann et al. _____ Feb. 22, 1955